Patented May 9, 1939

2,158,036

UNITED STATES PATENT OFFICE 2,158,036

HACK SAW STEEL

Harry A. Pavitt, Lockport, N. Y., assignor to Simonds Saw and Steel Co., Fitchburg, Mass., a corporation of Massachusetts No Drawing. Application August 17, 1938,
Serial No. 225,471

4 Claims. (Cl. 75—123)

This invention relates to an improved hack saw steel.

It has been the common practice to employ tungsten or tungsten in combination with other alloying elements in order to impart to hack saw blades the desired properties. Such alloys are difficult to anneal, and have a tendency toward objectionable segregation. Many attempts have been made to produce a superior steel for this purpose, but improvement in quality has heretofore been at the expense of increased cost and other disadvantages.

The present invention is based upon the discovery that a superior hack saw blade can be made from a steel which is substantially free from tungsten, chromium, vanadium and the like, by employing molybdenum as the sole essential alloying element.

More specifically, the improved hack saw steel according to the present invention contains about 1.00% to 1.35% carbon and about .25% to 4.00% molybdenum with the usual amounts of deoxidizers and impurities such as silicon, manganese, phosphorous and sulphur. This carbon range has been found to be very practical from the melting standpoint, and is satisfactory insofar as the quality of the steel is concerned. The manganese preferably constitutes from .25% to .50% of the steel.

By way of example, there is set forth the following analysis of a hack saw blade according to the present invention:

| | Per cent |
|---|---|
| Carbon | 1.24 |
| Silicon | .35 |
| Manganese | .34 |
| Molybdenum | .61 |
| Iron (containing usual impurities) | Balance |
| Total | 100 |

The improved hack saw steel can be made by the well known processes employed for making tungsten alloys for this purpose. For example, the elements can be melted together in a basic electric arc furnace, and teemed into ingot molds. The ingots can then be forged, rolled, and finished in the usual way.

One particular advantage of the present steel lies in its ability to be annealed without the spoiling which occurs when tungsten alloys are annealed. The annealing may be carried out prior to the finish rolling operation, as will be understood by those skilled in the art.

Although the steel according to the present invention is particularly advantageous for hack saw blades, it may also be used for other purposes. It will be understood that small amounts of other elements may be present in this steel without adversely affecting the action of the molybdenum. The present steel is less expensive than the known tungsten steel and is characterized by a cutting life markedly greater than the life of tungsten alloys employed in hack saw blades.

What I claim is:

1. A hack saw blade substantially free from tungsten, comprising about 1.00% to 1.35% carbon and about .25% to 4% molybdenum, the balance being iron containing the usual deoxidizers and impurities.

2. A hack saw blade substantially free from tungsten, comprising about 1.00% to 1.35% carbon and about .25% to 4% molybdenum, the balance being iron containing the usual deoxidizers and impurities, including about .25% to .50% manganese.

3. An alloy steel substantially free from tungsten, comprising about 1.00% to 1.35% carbon and about .25% to 4% molybdenum as the sole alloying element, the balance being iron containing the usual deoxidizers and impurities.

4. An alloy steel substantially free from tungsten, comprising about 1.00% to 1.35% carbon and about .25% to 4% molybdenum as the sole alloying element, the balance being iron containing the usual deoxidizers and impurities, including about .25% to .50% manganese.

HARRY A. PAVITT.